United States Patent
Green

(10) Patent No.: US 11,363,794 B2
(45) Date of Patent: Jun. 21, 2022

(54) ANIMAL WASTE DISPOSAL APPARATUS

(71) Applicant: Colette Green, Beldenville, WI (US)

(72) Inventor: Colette Green, Beldenville, WI (US)

(*) Notice: Subject to any disclaimer, the term of this patent is extended or adjusted under 35 U.S.C. 154(b) by 734 days.

(21) Appl. No.: 16/360,740

(22) Filed: Mar. 21, 2019

(65) Prior Publication Data

US 2020/0296917 A1 Sep. 24, 2020

(51) Int. Cl.
*A01K 1/01* (2006.01)
*B65F 1/14* (2006.01)

(52) U.S. Cl.
CPC ............... *A01K 1/01* (2013.01); *B65F 1/141* (2013.01); *B65F 2240/136* (2013.01)

(58) Field of Classification Search
CPC .... A01K 1/0117; A01K 1/011; A01K 1/0114; A01K 1/0135; A01K 1/0107; A01K 15/021; A01K 15/02
USPC ........ 119/164, 163, 161, 165, 166; D30/161
See application file for complete search history.

(56) References Cited

U.S. PATENT DOCUMENTS

| | | | |
|---|---|---|---|
| 3,119,374 A * | 1/1964 | Ladner | A01K 1/0135 482/61 |
| 3,734,057 A | 5/1973 | Lee et al. | |
| 3,793,988 A * | 2/1974 | Traeger | A01K 1/0117 119/164 |
| 3,871,331 A * | 3/1975 | Breau | A01K 1/0117 119/164 |
| 3,937,182 A * | 2/1976 | Kamimura | A01K 1/0114 119/161 |
| 4,011,837 A | 3/1977 | Ksioszk | |
| 4,050,414 A * | 9/1977 | Knochel | A01K 1/0117 119/164 |
| 4,196,693 A * | 4/1980 | Unversaw | A01K 1/0117 119/164 |
| 4,660,506 A * | 4/1987 | Nalven | A01K 1/011 119/163 |
| 4,957,131 A | 9/1990 | Robinson | |
| 5,279,258 A * | 1/1994 | Kakuta | A01K 1/0117 119/164 |
| 5,791,288 A | 8/1998 | Ehrler | |
| 6,453,844 B1 * | 9/2002 | Janzen | A01K 1/011 119/161 |

(Continued)

FOREIGN PATENT DOCUMENTS

| | | |
|---|---|---|
| EP | 2790844 B1 | 10/2014 |
| KR | 101380617 B1 | 4/2014 |

*Primary Examiner* — Yvonne R Abbott-Lewis
(74) *Attorney, Agent, or Firm* — Johnson and Phung; Thomas N. Phung

(57) ABSTRACT

A pet waste disposal apparatus having an open top container, a sloping floor surface, an outlet drain, a pair of spaced apart support bars located within and connecting the side walls of the container, a walking board supported on the support bars, a first roller located between the first end of the walking board and a second roller located between the second end of the walking board, a waste inlet located between the first roller and the first end of the container, a rotating belt having an artificial turf exterior surface and tensioned mounted to the rollers, an electrically driven cover plate moveable between a closed and opened position, a spray cleaning system located within the container for cleaning the rotating belt of wastes and directing pet wastes out of the container and a motor for powering rollers, the cover plate, and the spray cleaning system.

20 Claims, 2 Drawing Sheets

(56) References Cited

U.S. PATENT DOCUMENTS

| | | | |
|---|---|---|---|
| 6,769,382 B2 | 8/2004 | Chiu | |
| 6,938,579 B2 | 9/2005 | Sharpe | |
| 7,290,499 B2 * | 11/2007 | Emery | B65G 25/02 |
| | | | 119/166 |
| 8,316,801 B1 | 11/2012 | Nottingham et al. | |
| 8,464,662 B1 * | 6/2013 | Shorenstein | A01K 1/0107 |
| | | | 119/164 |
| 9,737,046 B1 * | 8/2017 | Pugh | A01K 1/0135 |
| 2006/0225659 A1 * | 10/2006 | Axelrod | A01K 1/011 |
| | | | 119/164 |
| 2012/0073507 A1 | 3/2012 | Anderson | |
| 2014/0311414 A1 | 10/2014 | Morris | |
| 2017/0347619 A1 | 12/2017 | Cook et al. | |

* cited by examiner

ANIMAL WASTE DISPOSAL APPARATUS

FIELD OF THE INVENTION

This invention relates generally to pet waste disposal and, more specifically to a pet waste disposal system that deposits pet waste directly into the sewer system with minimal human interaction with the pet waste.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The most environmentally safe way to dispose of pet waste is through a city's waste treatment facilities where it can be processed appropriately. Currently, most methods of getting the pet waste into the sewer systems involves human interaction with the waste namely picking up the pet waste by hand, which is undesirable and may have sanitary related issues.

The present invention seeks to provide a solution to this problem by providing a pet waste disposal system that deposits pet waste directly into the sewer system without any human interaction or the need to pick the pet waste up by hand or any handheld or hand operated device. In use the pet eliminates directly onto an artificial turf that is fashioned into a belt and mounted on rollers. When the turf belt is rotated preferably by a motorized gear system, the pet waste is dropped into a collection basin and then flushed with sprayers into a pipe which is connected to an existing sewer system. The underside of the turf belt is cleaned with sprayers inside the basin. The system is designed for outdoor or indoor use, in commercial or residential settings.

SUMMARY OF THE INVENTION

Briefly, the present invention comprises a pet waste disposal apparatus that includes a waterproof open top container having a first end, a second end, a pair of sidewalls. Located within the waterproof open top container is a floor surface sloping from the first end to the second end of the open top container. An outlet drain located on the second end of the open top container connects the floor surface to an existing sewer line for receiving pet waste from the open top container therethrough.

The pet waste disposal apparatus also includes a pair of spaced apart support bars located within the open top container and connecting the side walls of the open top container and a water and weather proof walking board having a first end, a second end and a top surface. The walking board is fixedly supported on the pair of support bars between the pair of sidewalls of the open top container. The pet waste disposal apparatus also includes a first electrically driven roller located between the first end of the walking board and the first end of the open top container and supported at least partially within the open top container by the pair of the walls and a second electrically driven roller located between the second end of the walking board and the second end of the open top container and supported at least partially within the open top container by the pair of the walls.

The pet waste disposal apparatus further includes a rotating belt having a waterproof artificial turf exterior surface and an interior surface and is tensioned mounted to the pet waste disposal apparatus by the engagement of the inner interior surface of the rotating belt to the exterior surfaces of the first and second electrically driven rollers and the top surface of the walking board. Located between the first roller and the first end of the open top container is a pet waste inlet for receiving pet waste from the waterproof artificial turf exterior surface when pet waste disposal apparatus is in use.

The pet waste disposal apparatus also includes an electrically driven cover plate mounted proximal the first end of the open top container and moveable in an angular direction between a closed position and an opened position to allow the pet waste inlet to receive pet waste from the rotating belt into the open top container and a spray cleaning system located within the open top container with the spray cleaning system having at least one sprayer for cleaning the waterproof artificial turf exterior surface of the rotating belt of pet wastes while simultaneously directing pet wastes located on the floor surface of the container through the outlet of the open top container and at least one motor for powering at least one of electrically driven rollers, the electrically driven cover plate, and the spray cleaning system.

DESCRIPTION OF THE PREFERRED EMBODIMENT

The present invention reduces or solves the problem associated with an environmentally safe and friendly way to dispose of pet waste through the waste treatment facilities where it can be processed appropriately with minimal human interaction with the waste.

Figure 1:
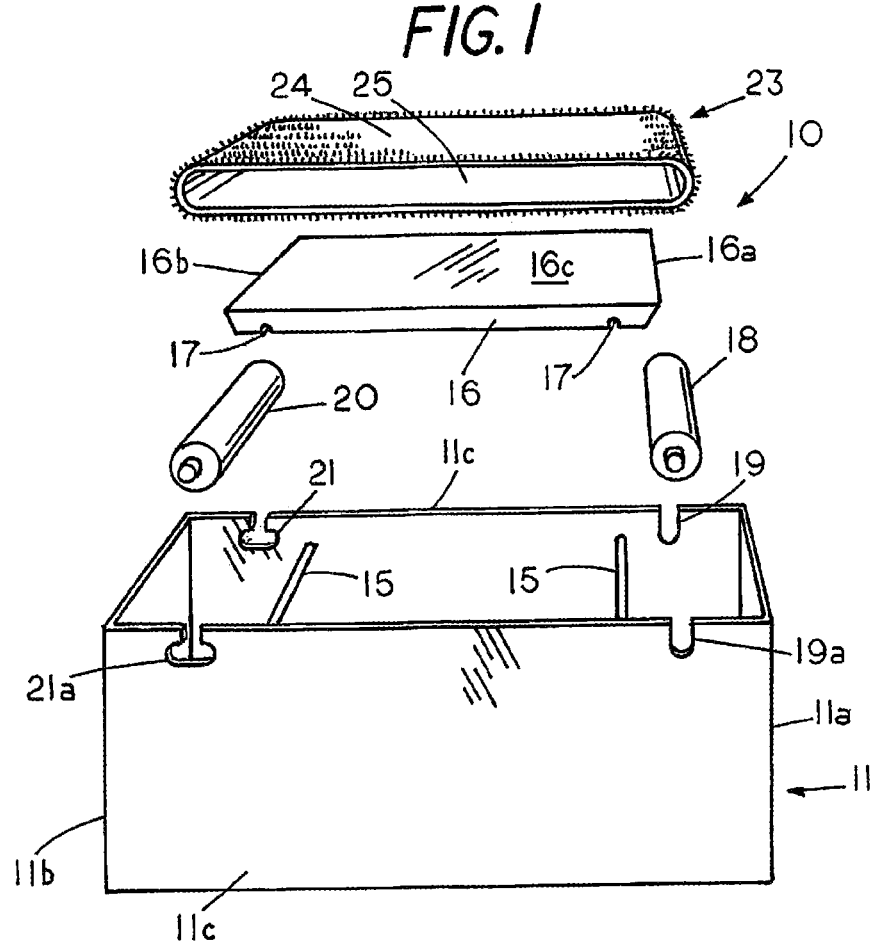
FIG. 1 is a blow-up view of an embodiment of a pet waste disposal apparatus of the present invention.
Figure 2:
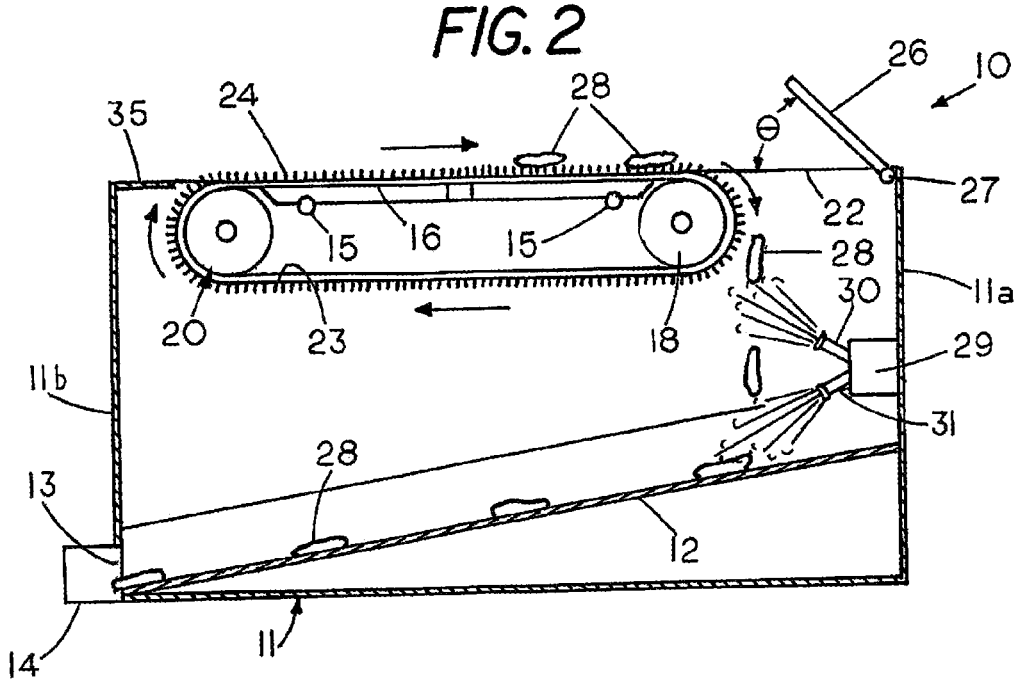
FIG. 2 is a cross sectional view of the pet waste disposal apparatus of FIG. 1.
Figure 3:
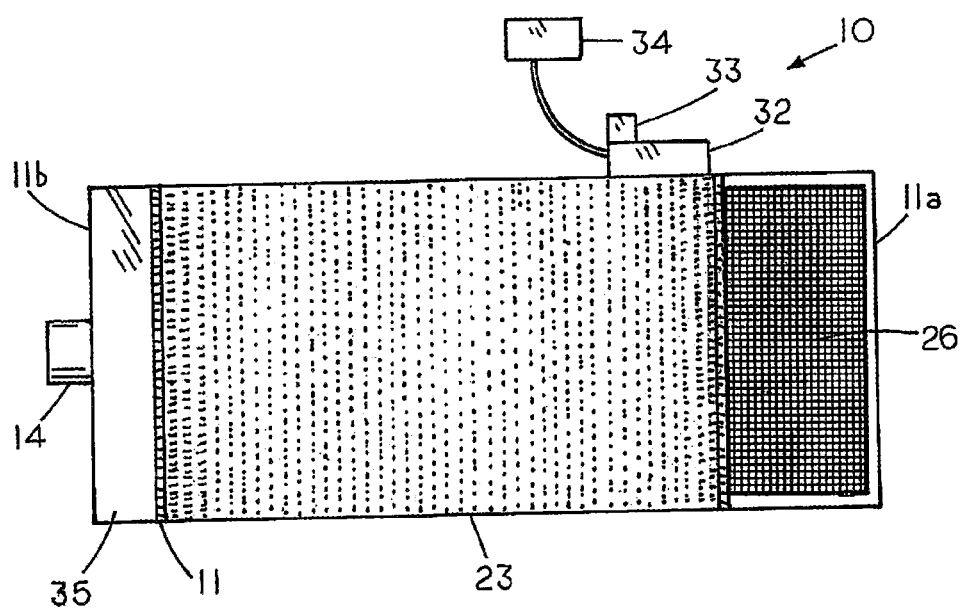
FIG. 3 is a top view of the pet waste disposal apparatus of FIG. 1.
Figure 4:
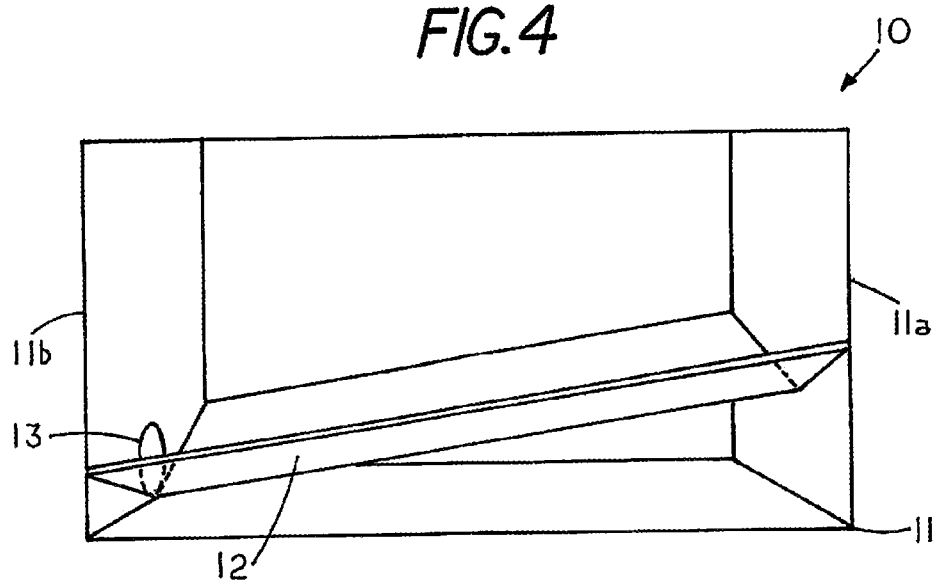
FIG. 4 is a cross-sectional view of the pet waste disposal apparatus of FIG. 1.

Referring to FIGS. 1-4, FIG. 1 is a blow-up view, FIG. 2 is a cross sectional view, FIG. 3 is a top view, and FIG. 4 is a partial cross-sectional view showing an embodiment of the present invention that includes a pet waste disposal apparatus 10 having a basin or a waterproof open top container 11 with a first end 11a, a second end 11b, and a pair of sidewalls 11c. The waterproof open top container 11 includes a floor surface and preferably a V-shaped floor surface 12 located within an interior of the open top container 11 with the V-shaped floor surface 12 sloping from the first end 11a to the second end 11b of the open top container 11. The waterproof open top container 11 preferably is made of a durable, waterproof material that can withstand extreme temperatures Pet waste disposal apparatus 10 includes a drain outlet 13 located on the second end 11b of the open top container 11. Drain outlet 13 is shown connected to the V-shaped floor surface 12 and an existing sewer pipe line 14 to facilitate the transfer of pet waste collected within the open top container 11 to the waste treatment facilities. Although not shown, drain outlet 13 may comprise a standard size hole that connects to a sewer drain pipe with the sewer drain pipe preferably including a P-trap located a short distance after the waste leaves the open top container 11 to prevent sewer gas from escaping. The drain pipe is then connected to existing sewer pipe 14.

Pet waste disposal apparatus 10 also includes a pair of spaced apart support bars 15 located within the open top container 11 and connecting the side walls 11c of the open top container 11. A water and weather proof walking board 16 having a first end 16a, a second end 16b and a top surface 16c is shown supported on the pair of support bars 15 between the pair of sidewalls 11c of the open top container 11 in a removably fixed condition. Although walking board 16 may be supported on the support bars 15 by a plurality of means, in the embodiment of FIGS. 1 and 2 walking board 16 is shown supported on the pair of support bars 15 through the engagement of a pair of notches located on an underside of walking board 16 with the corresponding pair of support bars 15. The walking board of the present invention may comprise of a plurality of materials as long as the material is smooth, durable, water and weather proof, preferably rigid, and can withstand extreme temperatures. An example of a suitable walking board includes a skid plate.

Pet waste disposal apparatus 10 also includes a first electrically driven roller 18 and a second electrically driven roller 20. The first electrically driven roller 18 is located between the first end 16a of the walking board 16 and the first end 11a of the open top container 11 and supported at least partially within the open top container 11 by the pair of the walls 11c. In the embodiment of FIGS. 1 and 2 first electrically driven roller 18 are specifically shown supported at least partially within the open top container 11 by a set of U-Shaped slot 19, 19a located on the pair of the walls 11c.

Located between the first roller 18 and the first end 11a of the open top container 11 is a pet waste inlet 22 for receiving pet waste therethrough when pet waste disposal apparatus 10 is in use.

The second electrically driven roller 20 is located between the second end 16b of the walking board 16 and the second end 11b of the open top container 11 and supported at least partially within the open top container 11 by the pair of the side walls 11c.

In the embodiment of FIGS. 1 and 2 second electrically driven roller 20 is specifically shown supported at least partially within the open top container 11 by a pair of opened top slots 21, 21a located on the pair of the walls 11c. A feature of receiving slots 21 and 21a is that receiving slots 21 and 21a allows for tension adjustment of second electrically driven roller 20.

In regards to the rollers of the present invention, In the embodiment of FIG. 2, the first electrically driven roller 18 and the second electrically driven roller 20 are shown located completely within the open top container 11. Although pet waste disposal apparatus 10 shows the use of two electrically driven rollers 18, 20, alternative embodiments of the present invention may include the use of more than 2 electrically driven rollers and at least one electrically driven roller and at least one free rotating or free moving roller.

The rollers are sized so that they expand the width of the open top container 11. Although the rollers may vary in size depending on the size and specific request of the owners of pet waste disposal apparatus 10, the rollers of pet waste disposal apparatus 10 normally range between 1-5 inches in diameter. Preferably, the rollers are made of a durable material which can withstand extreme temperatures and wet conditions and are adjustable and removable from the open top container 11.

Pet waste disposal apparatus 10 further includes a rotating belt 23 having a waterproof artificial turf exterior surface 24 and an interior surface 25. It is noted that turf exterior surface 24 may comprise a manufactured grass or lawn which is fashioned into rotating belt 23. A feature of turf exterior surface 24 is that turf exterior surface 24 is durable and yet flexible. Preferably, the grass blades are of medium length and of a texture that is comfortable for dogs to walk on. Preferably, the turf exterior surface 24 is easy to clean and odor resistant.

In the embodiment of FIG. 2 rotating belt 23 is shown tensioned mounted to the first and second electrically driven rollers 18, 20 by the engagement of the inner interior surface 25 of the rotating belt 23 to the exterior surfaces of the first and second electrically driven rollers 18, 20 and the top surface 16c of the walking board 16. The mounting fit of rotating belt 23 to pet waste disposal apparatus 10 may be adjusted through the tension adjustment of second electrically driven roller 20.

Pet waste disposal apparatus 10 also includes an electrically driven cover plate 26 mounted, and preferably mounted, to a hinge 27 proximal the first end 11a of the open top container 11 and moveable in an angular direction 0 between a closed position and an opened position to allow the pet waste inlet 22 to receive pet waste 28 from the rotating belt 23 into the open top container 11 for pet waste collection. The electrically driven cover plate 26 is preferably made of a durable material that can withstand extreme temperatures. In the embodiment of FIG. 3 the electrically driven cover plate 26 comprises a mesh on a metal framework to deter the dog from defecating in that area and allow for urine or feces to fall through into the open top container 11.

FIGS. 2 and 3 also shows an optional cover plate 35 removably attached to the open top container 11 and located between the second electrically driven roller 20 and the second end of open top container 11b with cover plate 35 functioning to limit access to the interior of open top container 11.

In order to clean and sanitize the rotating belt 23 pet waste disposal apparatus 10 includes a spray cleaning system 29 located within the open top container 11 with the spray cleaning system 29 having at least one sprayer for cleaning the waterproof artificial turf exterior surface 24 of the rotating belt 23 of pet wastes 28 while simultaneously directing pet waste 28 located on the V-shaped floor surface 12 of the open top container 11 through the drain outlet 13 of the open top container 11 and into the existing sewer pipe 14 to facilitate the transfer of pet waste collected within the open top container 11 to the waste treatment facilities. In the Embodiment of FIG. 2, spray cleaning system 29 is shown having a rotating belt cleaning sprayer 30 and a floor surface cleaning sprayer 31. Although not shown the spray cleaning system of the present invention may include further sprayers for cleaning other areas within open top container 11 and may also be located at different region areas within open top container 11 including but not limited to completely underneath the rotating belt 23 and on floor surface 12. The spray cleaning system is preferably designed to be hooked up to an existing water supply through a leak-proof connection.

Pet waste disposal apparatus 10 also includes at least one motor 32 for powering at least one of the electrically driven rollers 18, 20, the electrically driven cover plate 26, and the spray cleaning system 29. In the embodiment of FIG. 3, the motor 32 is shown located on an exterior of the open top container 11. It is noted that alternative embodiments of the present invention may include a separate motor for powering the at least one if not both of the electrically driven rollers 18, 20, a separate motor for powering the electrically driven cover plate 26, and a separate motor for powering the spray cleaning system 29.

FIG. 3 also shows an external control system 33 located on an exterior of the open top container 11 and connected to motor 32 with external control system 33 functioning to control and operate the electrically driven rollers 18, 20, the electrically driven cover plate 26, and the spray cleaning system 29. FIG. 3 also shows a power source 34 connected to motor 32 to provide the necessary fuel to power the operation of pet waste disposal apparatus 10. Power source 34 may comprise of a variety sources including but not limited the traditional power grids and alternative power sources including solar power and wind power.

Preferably, control system 33 comprises a remote-control unit and may include and also operate various safety features, such as but not limited to a weight sensor which will prevent motor 32 from turning on when there is a designated amount of weight on the walking board 16, a mechanism of sensing pressure or movement on the rotating belt 23, a motion detector, light sensors, weight sensor or other feedback mechanism which will turn off the motor and/or disengage the gear system under predetermined conditions.

The control system 33 also may operate a heating system and any other electronic mechanisms on pet waste disposal apparatus 10. Although not shown, the heating system may comprise weather and waterproof heating elements located on or embedded within various components of pet waste disposal apparatus 10 and functions to prevent freezing when used in cold weather climates. For example, a heating system of pet waste disposal apparatus 10 may comprise heating elements that are mounted to pet waste disposal apparatus 10 in such a way as to prevent the rotating belt 23, the spray cleaning system 29 or the motor 32 from freezing. Preferable locations for the heating element include but is not limited to the underside of the walking board 16, under the V-shaped floor surface 12 of the open top container 11, under a motor encasement for motor 32, and around the walls of the open top container 11.

The pet waste disposal apparatus 10 of the present invention may also include other options available to the potential users including but not limited to a place to attach a "pee hydrant" or "pee tree" to the pet waste disposal apparatus 10, a waterproof coating of the rotating belt 23, optional unit sizes of small, medium and large, a cleaning solution dispenser added to the spray cleaning system 29, a variety of colors for turf exterior surface 24.

In the general operation of pet waste disposal apparatus 10, pets such as canines will defecate on the waterproof artificial turf exterior surface 24 of rotating belt 23. A signal will be sent to motor 32 such as by control system 33 to rotate the electrically driven rollers 18, 20 resulting in the rotation of rotating belt 23. The rotation of rotating belt 23 will in turn signal for the angular movement of electrically driven cover plate 26 from a closed position to an opened position to allow the pet waste inlet 22 to receive pet waste 28 dropped from the rotating belt 23 into the open top container 11 for pet waste collection. In order to clean off any residue pet waste that did not drop from rotating belt 23 spray cleaning system 29 is activated, which powers rotating belt cleaning sprayer 30 to shoot a continuous jet stream of water or a combined water and cleaning solution at the waterproof artificial turf exterior surface 24 of the rotating belt 23 to remove any remaining pet waste from waterproof artificial turf exterior surface 24. The floor surface cleaning sprayer 31 of spray cleaning system 29 is also activated to shoot a jet stream of water or combined water and cleaning solution at the V-shaped floor surface 12 of the open top container 11 to simultaneously direct pet waste 28 located on the V-shaped floor surface 12 of the open top container 11 through the drain outlet 13 of the open top container 11 and into the existing sewer pipe 14 to facilitate the transfer of pet waste collected within the open top container 11 to the waste treatment facilities.

I claim:

1. A pet waste disposal apparatus comprising:
    a waterproof open top container having a first end, a second end, a pair of sidewalls;
    a floor surface located within the open top container with the floor sloping from the first end to the second end of the open top container;
    an outlet drain located on the second end of the open top container and connected to the floor surface, the outlet drain connectable to an existing sewer line for receiving pet waste within the open top container;
    a pair of spaced apart support bars located within the open top container and connecting the side walls of the open top container;
    a water and weather proof walking board having a first end, a second end and a top surface, the walking board fixedly supported on the pair of support bars between the pair of sidewalls of the open top container;
    a first electrically driven roller located between the first end of the walking board and the first end of the open top container and supported at least partially within the open top container by the pair of the walls;
    a second electrically driven roller located between the second end of the walking board and the second end of the open top container and supported at least partially within the open top container by the pair of the walls;
    a pet waste inlet located between the first roller and the first end of the open top container;
    a rotating belt having a waterproof artificial turf exterior surface and an interior surface, the rotating belt tensioned mounted by the engagement of the inner interior surface of the rotating belt to the exterior surfaces of the first and second electrically driven rollers and the top surface of the walking board;
    an electrically driven cover plate mounted proximal the first end of the open top container and moveable in an angular direction between a closed position and an opened position to allow the pet waste inlet to receive pet waste from the rotating belt into the open top container;
    a spray cleaning system located within the open top container, the spray cleaning system having at least one sprayer for cleaning the waterproof artificial turf exterior surface of the rotating belt of pet wastes while simultaneously directing pet wastes located on the floor surface of the container through the outlet of the open top container; and
    at least one motor for powering at least one of electrically driven rollers, the electrically driven cover plate, and the spray cleaning system.

2. The pet waste disposal apparatus of claim 1 wherein the floor surface comprises a v-shaped floor surface sloping from the first end to the second end of the open top container.

3. The pet waste disposal apparatus of claim 1 wherein the walking board comprises a skid plate.

4. The pet waste disposal apparatus of claim 1 wherein the first electrically driven roller and the second electrically driven roller are located completely within the open top container.

5. The pet waste disposal apparatus of claim 1 including a removable cover plate located between the second electrically driven roller and the second end of the open top container.

6. The pet waste disposal apparatus of claim 1 wherein the spray cleaning system is located underneath the rotating belt.

7. The pet waste disposal apparatus of claim 1 wherein the spray cleaning system includes a rotating belt cleaning sprayer and a floor surface cleaning sprayer.

8. The pet waste disposal apparatus of claim 1 wherein the at least one motor comprise a first motor for powering the at least one of electrically driven rollers, a second motor for powering the electrically driven cover plate, and a third motor for powering the spray cleaning system.

9. The pet waste disposal apparatus of claim 1 wherein the electrically driven rollers, the electrically driven cover plate, and the spray cleaning system are all controlled by a control system.

10. The pet waste disposal apparatus of claim 1 wherein the at least one motor is located on an exterior of the open top container.

11. A pet waste disposal apparatus comprising:
a waterproof open top container having a first end, a second end, a pair of sidewalls;
a sloping floor surface located within the open top container;
an outlet drain connected to the sloping floor surface and connectable to an existing sewer line for receiving pet waste within the open top container;
a pair of spaced apart support bars located within the open top container and connecting the side walls of the open top container;
a water and weather proof walking board having a first end, a second end and a top surface, the walking board fixedly supported on the pair of support bars between the pair of sidewalls of the open top container;
a first electrically driven roller located between the first end of the walking board and the first end of the open top container and supported at least partially within the open top container by the pair of the walls;
a second electrically driven roller located between the second end of the walking board and the second end of the open top container and supported at least partially within the open top container by the pair of the walls;
a pet waste inlet located between the first roller and the first end of the open top container;
a rotating belt having a waterproof artificial turf exterior surface and an interior surface, the rotating belt tensioned mounted by the engagement of the inner interior surface of the rotating belt to the exterior surfaces of the first and second electrically driven rollers and the top surface of the walking board;
an electrically driven cover plate mounted proximal the first end of the open top container and moveable in an angular direction between a closed position and an opened position to allow the pet waste inlet to receive pet waste from the rotating belt into the open top container;
a spray cleaning system located within the open top container, the spray cleaning system having at least one sprayer for cleaning the waterproof artificial turf exterior surface of the rotating belt of pet wastes while simultaneously directing pet wastes located on the floor surface of the container through the outlet of the open top container; and
at least one motor for powering at least one of electrically driven rollers, the electrically driven cover plate, and the spray cleaning system.

12. The pet waste disposal apparatus of claim 11 wherein the sloping floor surface slops comprises a V-shaped floor surface sloping from the first end to the second end of the open top container.

13. The pet waste disposal apparatus of claim 12 wherein the first electrically driven roller and the second electrically driven roller are located completely within the open top container.

14. The pet waste disposal apparatus of claim 13 wherein the electrically driven rollers, the electrically driven cover plate, and the spray cleaning system are all controlled by a control system.

15. The pet waste disposal apparatus of claim 14 wherein the at least one motor is located on an exterior of the open top container.

16. The pet waste disposal apparatus of claim 15 wherein the spray cleaning system is located underneath the rotating belt.

17. The pet waste disposal apparatus of claim 16 wherein the spray cleaning system includes a rotating belt cleaning sprayer and a floor surface cleaning sprayer.

18. A pet waste disposal apparatus comprising:
a waterproof open top container having a first end, a second end, a pair of sidewalls;
a V-shaped floor surface located within the open top container with the floor sloping from the first end to the second end of the open top container;
an outlet drain located on the second end of the open top container and connected to the floor surface, the outlet drain connectable to an existing sewer line for receiving pet waste within the open top container;
a pair of spaced apart support bars located within the open top container and connecting the side walls of the open top container;
a water and weather proof walking board having a first end, a second end and a top surface, the walking board fixedly supported on the pair of support bars between the pair of sidewalls of the open top container;
a first electrically driven roller located between the first end of the walking board and the first end of the open top container and supported completely within the open top container by the pair of the walls;
a second electrically driven roller located between the second end of the walking board and the second end of the open top container and supported completely within the open top container by the pair of the walls;
a pet waste inlet located between the first roller and the first end of the open top container;
a rotating belt having a waterproof artificial turf exterior surface and an interior surface, the rotating belt tensioned mounted by the engagement of the inner interior surface of the rotating belt to the exterior surfaces of the first and second electrically driven rollers and the top surface of the walking board;
an electrically driven cover plate mounted proximal the first end of the open top container and moveable in an angular direction between a closed position and an opened position to allow the pet waste inlet to receive pet waste from the rotating belt into the open top container;

a spray cleaning system located within the open top container underneath the rotating belt, the spray cleaning system having at least one sprayer for cleaning the waterproof artificial turf exterior surface of the rotating belt of pet wastes while simultaneously directing pet wastes located on the floor surface of the container through the outlet of the open top container;

at least one motor located on an exterior of the open top container for powering at least one of electrically driven rollers, the electrically driven cover plate, and the spray cleaning system; and a control system remotely controlling the electrically driven rollers, the electrically driven cover plate, and the spray cleaning system.

19. The pet waste disposal apparatus of claim 18 wherein the spray cleaning system includes a rotating belt cleaning sprayer and a floor surface cleaning sprayer.

20. The pet waste disposal apparatus of claim 19 wherein the at least one motor comprise a first motor for powering the at least one of electrically driven rollers, a second motor for powering the electrically driven cover plate, and a third motor for powering the spray cleaning system.

* * * * *